United States Patent [19]
Hansen

[11] 3,789,945
[45] Feb. 5, 1974

[54] VEHICLE CONTROL MODULE SUPPORT

[75] Inventor: Kenneth N. Hansen, Waukesha, Wis.

[73] Assignee: Allis-Chalmers Corporation, Milwaukee, Wis.

[22] Filed: Nov. 4, 1971

[21] Appl. No.: 195,641

[52] U.S. Cl................ 180/69 R, 180/90, 296/35 R
[51] Int. Cl.............................................. B62d 25/10
[58] Field of Search ..... 180/69, 89, 90, 54 R, 54 A, 180/54 F, 54 E, 54 D, 68, 77; 296/76, 35 R

[56] References Cited
UNITED STATES PATENTS

| | | | |
|---|---|---|---|
| 3,616,709 | 11/1971 | Malm | 180/77 R X |
| 2,952,328 | 9/1960 | Steiner | 180/69 R |
| 3,352,598 | 11/1967 | Anderson | 296/35 R |
| 3,302,743 | 2/1967 | Mosquera | 180/90 |
| 3,438,672 | 4/1969 | Gipp | 296/35 R |
| 2,612,233 | 9/1952 | Newell | 180/69 C |

FOREIGN PATENTS OR APPLICATIONS

| | | | |
|---|---|---|---|
| 969,227 | 5/1958 | Germany | 180/69 |

Primary Examiner—David Schonberg
Assistant Examiner—Milton L. Smith
Attorney, Agent, or Firm—Arthur L. Nelson

[57] ABSTRACT

A supporting arrangement including a firewall for supporting the control levers and instrument panel and a resilient joint connecting the rear end of the engine hood and side panel with the firewall.

10 Claims, 5 Drawing Figures

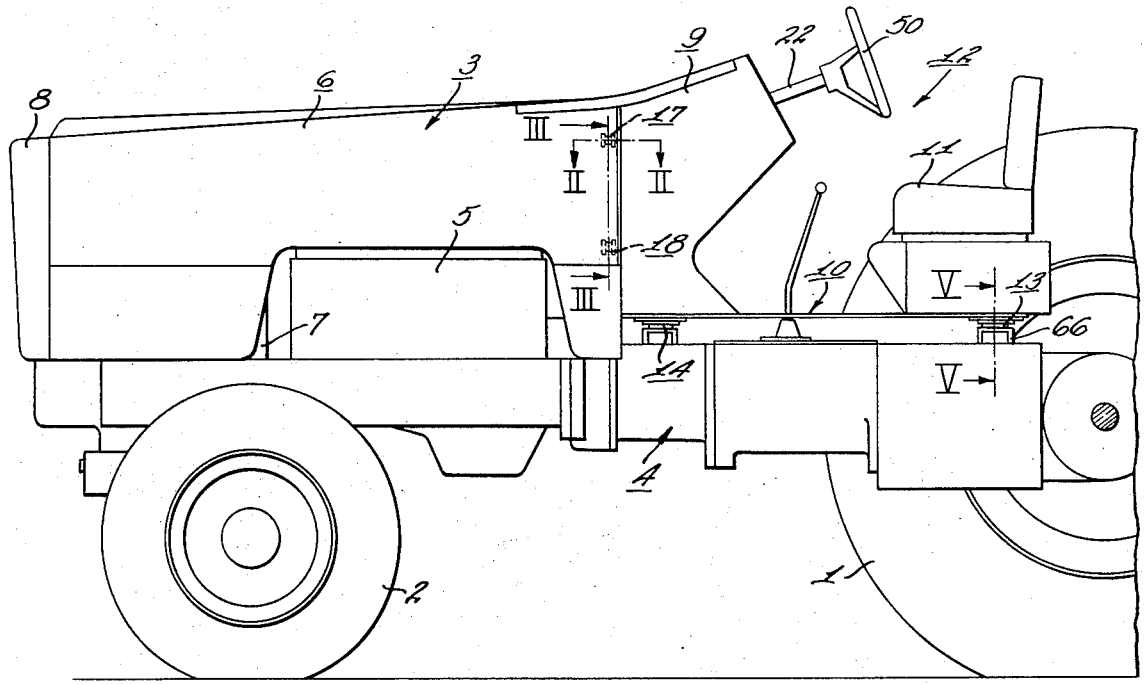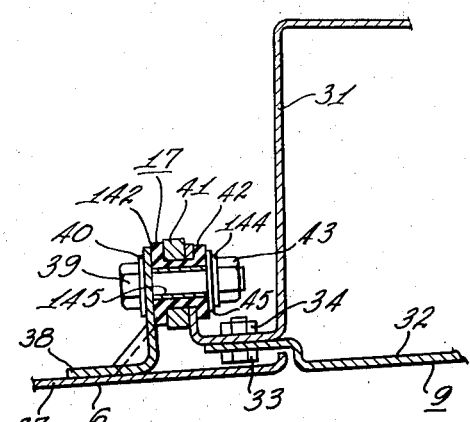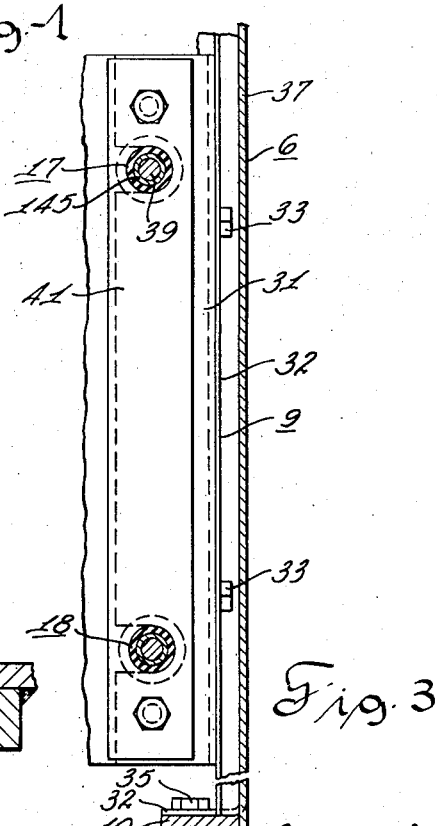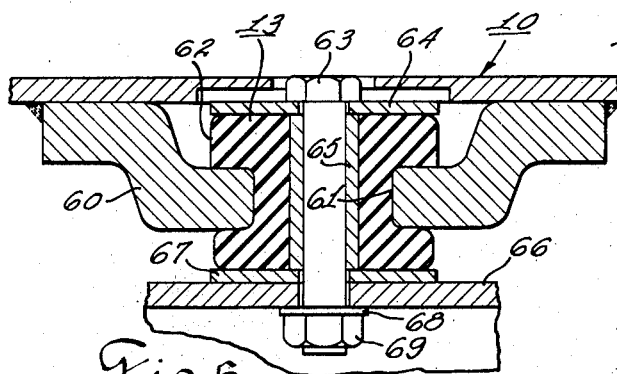

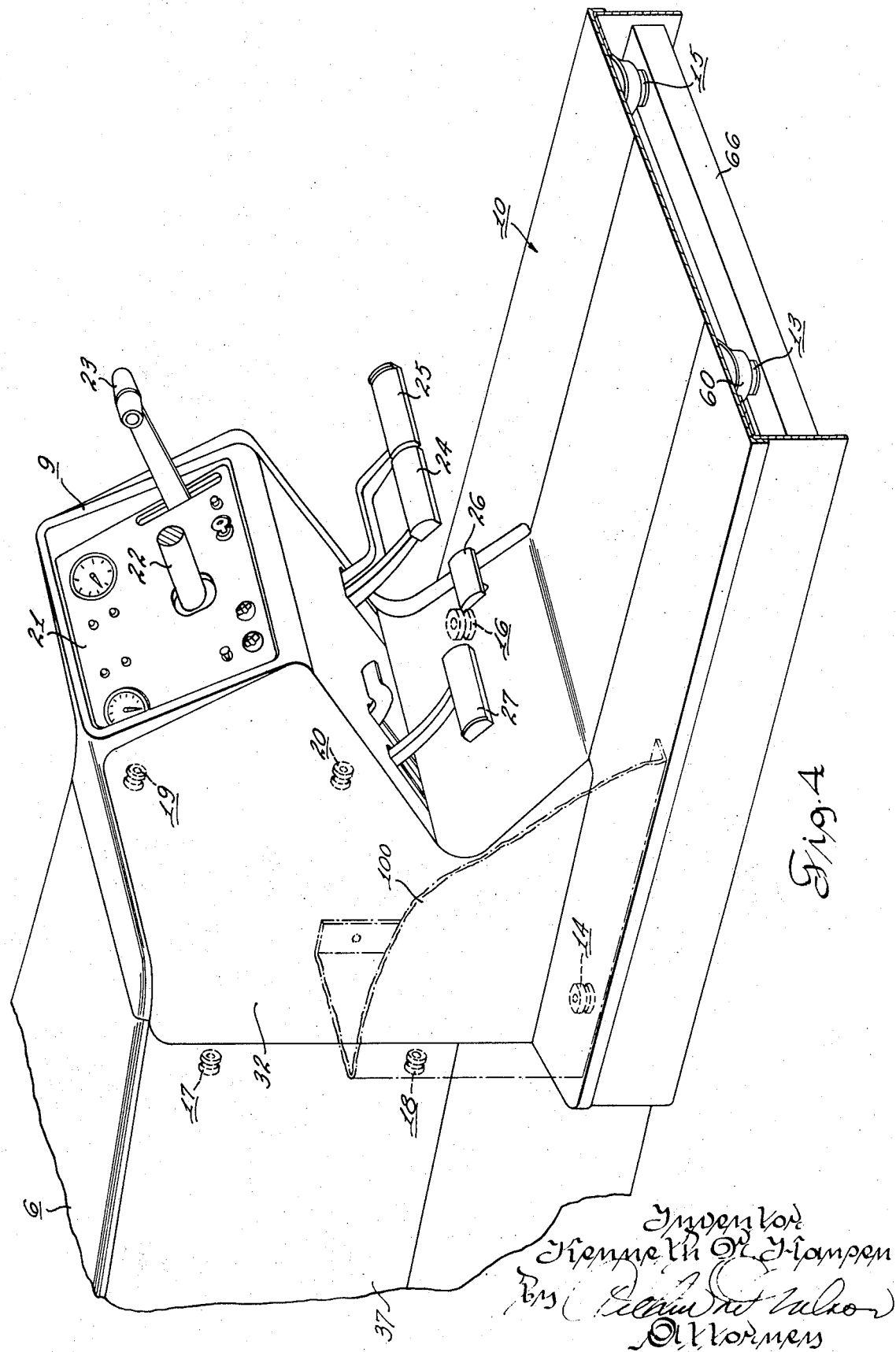

VEHICLE CONTROL MODULE SUPPORT

This invention relates to a support for a vehicle control module and more particularly to a resilient joint connecting the engine hood and the side panels with the control module and a resilient support for supporting the control module to provide resilient connections between the chassis and chassis supported components.

A conventional tractor requires a base frame or chassis from which the draft load of the vehicle can be drawn. The chassis must generally follow the contour of the terrain while pulling the implement. The operator's station should be partially shielded from shock and vibration of the chassis which is chassis. The engine hood is with a vehicle in which there is no spring suspension between the wheels and the chassis, and particularly in the large vehicle having a high speed engine. Dampening means to dampen the vibration at the control station is not only desirable, but is becoming a necessity because of the phythysical limitations of the operator and the fatigue encountered during long working hours. Associated with the control station it is desirable that the control levers, steering wheel, meters, and other indicators on the control panel should also be resiliently mounted with respect to the chassis. Accordingly, this invention provides a means whereby the control module, including the instrument panel, is resiliently mounted with relation to the the provided with a resilient joint between the control module and the chassis.

Accordingly, it is an object of this invention to isolate the control module from the chassis and the engine hood.

It is another object of this invention to provide a control station and a control module which are insulated from shock and vibration of the chassis and are insulated by a connection between the control module and the engine hood.

It is a further object of this invention to provide a resilient support at the control station with the platform connected to the control module and a resilient joint at its connection to the engine hood.

The objects of this invention are accomplished by mounting the structure defining the control station on resilient mounting supported by the chassis. The structure defining the control station generally includes the platform for supporting the operator in a standing position and the seat on the vehicle. Connected to the platform is a control module which includes the instrument panel, the steering wheel, and the control levers which normally are required to control the operation of a tractor. The engine hood enclosing the engine which is mounted on a chassis is connected through a resilient joint to the control module. The controls of the vehicle are connected through flexible connections to actuators on the chassis to permit relative movement between the control module and the platform with respect to the chassis.

Referring to the drawings, the preferred embodiment of this invention is illustrated.

FIG. 1 illustrates a side elevation view of the vehicle.

FIG. 2 is a cross section view taken on line II—II of FIG. 1.

FIG. 3 is a cross section view taken on line III—III of FIG. 1.

FIG. 4 is a three dimensional view of the control module and platform defining the operator station resiliently mounted with respect to the engine hood and vehicle chassis.

FIG. 5 is a cross section view taken on line V—V of FIG. 1.

Referring to the drawings, FIG. 1 illustrates the rear wheel 1 and front wheel 2 rotatably supporting the tractor 3. The tractor 3 includes a chassis 4 supporting an engine 5. The engine hood 6 is connected to the radiator 7 and grill 8 and a control module 9. The rearward portion of the engine hood 6 is resiliently supported on the control module 9. The control module 9 is connected to the platform 10 which is also resiliently supported on the chassis 4. The platform 10 supports the seat 11 to generally define the operator station 12. The control module 9 and platform 10 being resiliently mounted are permitted to move relative to the engine hood 6 and chassis 4. This provides a dampening of vibration and noise at the operator station.

Referring to FIG. 4, a three dimensional view illustrates the control module 9 and the platform 10 forming an integral structure which is resiliently mounted with respect to the remaining portion of the vehicle. The cab 100 which is optional is connected to the module 9 and platform 10. Four rubber insulators 13, 14, 15 and 16 support the platform while four additional insulators 17, 18, 19 and 20 connect the control module 9 with the engine hood. The engine hood is connected to the chassis and generally moves with the chassis.

The control module 9 includes an instrument panel 21 and supports the steering column 22 and the hand throttle 23 which extend upwardly from the panel.

Extending beneath the control module 9 are the brake pedals 24 and 25, the foot throttle 26, and also the clutch pedal 27 to provide control means for the operator.

The control module 9 is resiliently suspended on the chassis which cushions the instrument panel, gauges, meters and indicators. This cushion is also common to the control levers and steering wheel which the operator uses during operation of the vehicle. The cushioned support of the steering wheel is also comforting since extensive vibration for a long period of time transmitted through the steering wheel to the operator can be objectionable.

The control module 9 is shown rigidly connected to the platform 10. It is understood, however, that a resilient connection may be provided between the control module and the platform 10. It is, however, the preferred embodiment to affix the control module to the platform since the platform provides a supporting means for the operator at the operator station. This in turn supports a seat and the seat and platform move in conjunction with the control module so that movement sensed by the operator at the control station is generally coordinated with any movement of the control module itself.

More specifically, FIGS. 2 and 3 illustrate a firewall 31 rigidly affixed to the panel 32 of the control module by means of a plurality of bolts 33 and nuts 34. The side panel 32 extends downwardly and is fastened to the platform 10 by means of a plurality of bolts 35 and nuts 36. A side panel on the opposite side of the vehicle is similarly fastened.

The side panel 37 of the engine hood 6 is fastened to the brackets 38 on each side of the vehicle. Accordingly, connection between the firewall 31 and the engine side panels 37 is through the insulators 17, 18, 19 and 20.

Bolt 39 extends through the insulator 17 and carries a washer 40 resting against the head of the bolt 39 and bracket 38. The bolt 39 extends through the sleeve 145 and spacer 41 which is fabricated to the firewall 31. The rubber flanges 42 and 142 of the insulator 17 are drawn against the spacer 41 and firewall 31 as the bolt is tightened. The nut 43 is tightened against the lock washer 144 and washer 45 engaging sleeve 145. Accordingly, the connection between the firewall 31 and the bracket 38 is through the resilience of the rubber insulator 17. This provides a flexible joint between the engine hood and the control module.

Similarly, the platform is mounted on the chassis through rubber insulators 13, 14, 15 and 16. The platform 10 is supported by bracket 60 welded to the underside of the platform 10. The bracket 60 is formed with a central opening 61 which receives a rubber insulator 62. The bolt 63 carrying washer 64 extends through the sleeve 65 and insulator 62. A mounting 66 supported on the chassis 4 engages the washer 67 on the end of bolt 63. The lock washer 68 and nut 69 engage the end of the bolt 63 to mount the insulator assembly on the bracket 66 which carries the resiliently supported bracket 60 and platform 10. Four such insulator assemblies 13, 14, 15 and 16 support the platform 10 on the chassis 4 and provide a cushioning effect between the chassis and the platform.

A flexible connection between the control module 9 and the engine hood 6 and between the platform 10 and chassis 4 permits movement of the control module relative to the engine hood and chassis. The control module 9 carries the control levers and steering wheel necessary for controlling the operation of the vehicle. The dampening effect of the rubber insulators which support the control module provide a dampening effect from vibration and noise generated by the engine and from the roughness of terrain. Preferably the platform 10 is connected to the control module 9 to form a unit construction since the operator normally is positioned on the seat 11 or platform 10. It is understood, however, that the control module per se may be insulated from the rest of the vehicle which cushions the instruments and the meters on the control panel to reduce vibration of the needle indicator and so the meters are more easily readable. The control levers and steering wheel are provided with resilient connectors to the servo-mechanism which operates to control the vehicle. For instance, the steering wheel 50 operates through the steering column to control the hydraulic valve which in turn is connected through hydraulic conduits to a steering servomechanism to provide steering of the front wheels. Likewise, the throttle lever may be connected through Bowden wires or a similar mechanism to permit flexibility of the control device. The same situation exists where clutch and brakes may be operated hydraulically through hydraulic conduits connecting the control module to the servo-motors on the vehicle chassis per se. Accordingly, the control module is isolated from vibrations of the chassis and provides a more desirable control arrangement for the operator.

The embodiments of the invention in which an exclusive property or privilege is claimed are defined as follows:

1. A tractor comprising a control module having control means adapted for controlling the tractor by the operator, an engine hood defining an end surface lying adjacent to said control module at the rearward end of said engine hood, a tractor chassis supporting said engine hood, said control module defining a mating surface positioned in spaced relation to said end surface of said hood, resilient supporting structure resiliently supporting said control module on said chassis, supported bracket means mounted on the rearward end of said hood, supporting flange means on the forward end of said module, at least one rubber insulator connecting said supported bracket means of said engine hood and said supporting flange means of said module for maintaining the spaced relation between the end surface of said engine hood and the mating surface on said control module to thereby permit flexing movement between said control module and said engine hood.

2. A tractor as set forth in claim 1 wherein said resilient supporting structure includes, a platform connected to said control module to provide a rigid unit structure of said control module and said platform, resilient insulators resiliently supporting said platform on said chassis.

3. A tractor as set forth in claim 1 including at least four rubber insulators supporting the end surface of said engine hood in spaced relation to the mating surface on said control module.

4. A tractor as set forth in claim 1 wherein said control module includes a firewall defining a recess on its forward adjoining portion, said engine hood defining a complementary flange received in said recess of said firewall.

5. A tractor as set forth in claim 1 wherein said hood includes bracket means on the inner side of said engine hood, said control module includes a firewall defining supporting flanges on its forward end, a bolt extending between the bracket means on said engine hood and the firewall of said control module, a rubbber insulator receiving said bolt and positioned between the bracket means on said engine hood and the firewall of said control module to thereby provide resilient connecting means.

6. A tractor as set forth in claim 1 including a platform connected to said control module forming integral structure with said control module, a cab supported on said module and said platform, means connecting said cab with said control module and platform to thereby provide integral structure between said control module, said platform, and said cab.

7. A tractor as set forth in claim 1 wherein said engine hood defines a vertical connecting surface adjacent the end surface of said engine hood, a mating vertical supporting surface defined by said control module positioned adjacent said vertical surface on said engine hood, a plurality of rubber insulators positioned intermediate said vertical surfaces including fastening means for resiliently connecting said control module relative to said engine hood.

8. A tractor as set forth in claim 1 wherein said control module includes, a firewall, an instrument panel and steering means positioned on said firewall, side panels connected to said firewall and extending rearwardly alongside of said control module.

9. A tractor as set forth in claim 1 wherein each of said rubber insulators includes, a rubber bushing, a sleeve connected to said module embracing said bushing, a bolt connected to said engine hood extending through said rubber bushing and compressively forcing rubber washer portions against said sleeve to thereby provide a resilient connection between said module and said head.

10. A tractor as set forth in claim 1 wherein said engine hood includes a plurality of brackets fabricated to the inner side and rearward end of said engine hood, a plurality of flanges connected to the forward end of said control module, a plurality of insulators including a plurality of bolts connected to the bracket means on said engine hood, a plurality of rubber bushings received on said bolts and positioned between the bracket means on said engine hood and the flanges of said control module, said bolts compressively positioning flanges of said bushings between the brackets of said engine hood and the flanges on said control module to provide resilient connection between said control module and said engine hood.

* * * * *